United States Patent Office 3,435,263
Patented Mar. 25, 1969

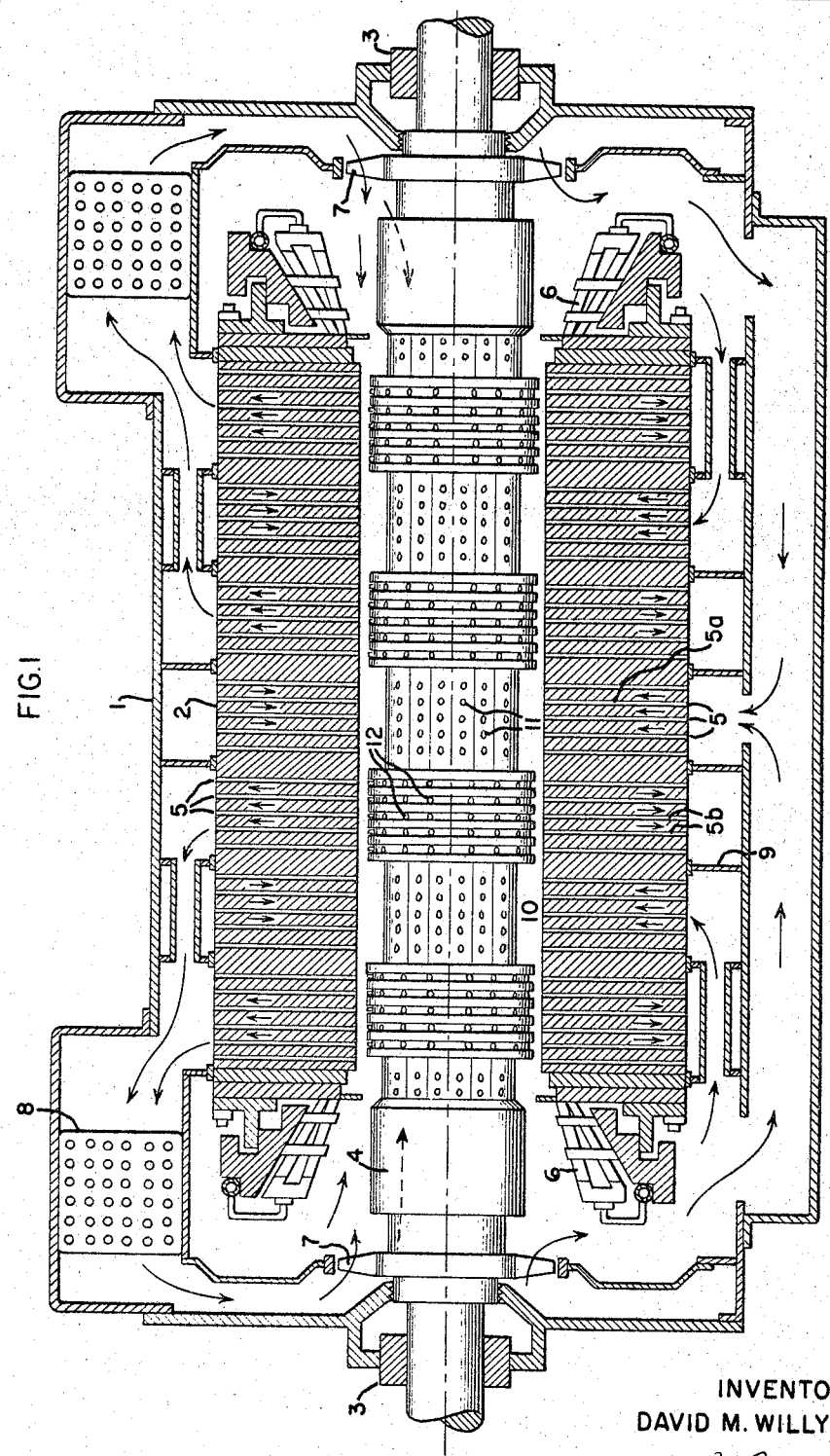

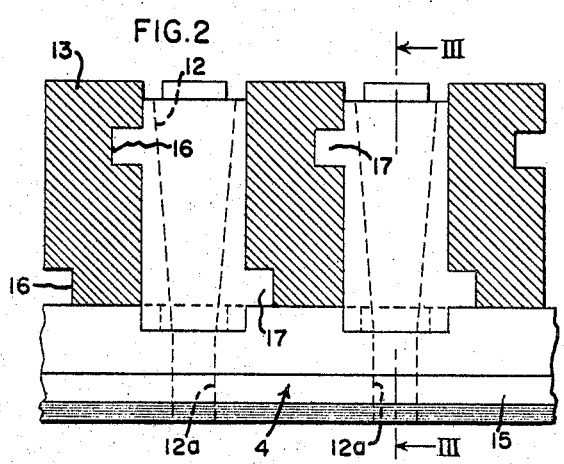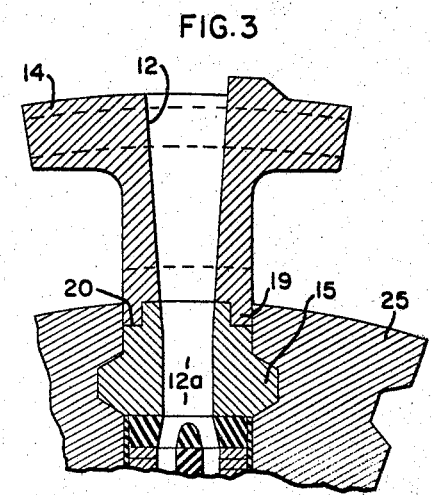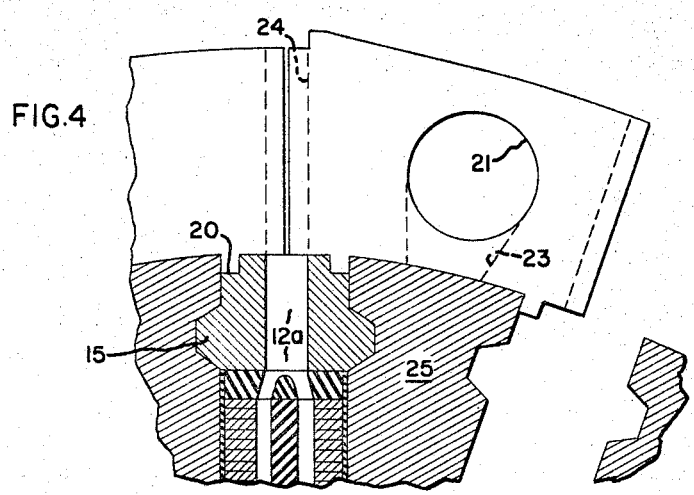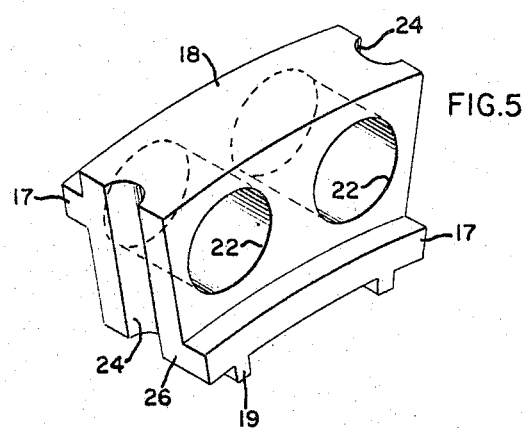

3,435,263
GAP PICKUP ROTOR WITH RADIALLY EXTENDED OUTLETS
David M. Willyoung, Scotia, N.Y., assignor to General Electric Company, a corporation of New York
Filed May 4, 1966, Ser. No. 547,526
Int. Cl. H02k 9/06
U.S. Cl. 310—61                           5 Claims

ABSTRACT OF THE DISCLOSURE

A gas cooled dynamoelectric machine rotor arranged to circulate cooling gas between the windings and the air gap by self-pumping action employs extension members held by rings on the rotor. The extension members have gas outlet holes terminating at a greater diameter than the gas inlet holes so as to augment the gas pumping action.

---

This invention relates to an improved gas-cooled dynamoelectric machine and more particularly to a gas-cooled generator of the type wherein coolant gas flow through rotor conductors is produced by pumping action of the rotor itself, using the gap pickup principle.

It is known in the art that generator rotor (field) windings can be effectively cooled by the gap pickup principle. A gap pickup rotor is one having surface holes or passages which scoop coolant gas from the "air gap" between the rotor and stator. The gas thus scooped is motivated through internal passages along the conductors to effect the desired cooling. The gas is then discharged back to the air gap through outlet passages. It is also known to dispose the gap inlet and outlet holes along the rotor in groups to provide inlet zones and outlet zones for better control of the flow of cooled and heated gas.

Cooling of generator conductors is one of the critical areas in the generator art. Any improvement in cooling would enable an increase in the rating of a given size generator.

Accordingly, it is an object of the present invention to provide a generator with improved gap pickup cooling effectiveness.

Other objects, advantages and features of the present invention will become apparent from the following description taken in connection with the accompanying drawing.

Briefly stated, the present invention is practiced in one form by a gap pickup rotor having inlet and outlet zones, the holes in the outlet zones being at a raised diameter greater than that of the inlet holes. This results in the rotor acting as a centrifugal gas pump or blower, taking gas in at one radius and discharging it at a greater radius.

In the drawing:

FIG. 1 is a composite plan and elevation view, partly in section, of a hydrogen cooled generator with gap pickup rotor cooling.

FIG. 2 is an elevation view, partly in section, of a portion of a rotor outlet zone as shown in FIG. 1.

FIG. 3 is a sectional view along line III—III of FIG. 2.

FIG. 4 is a sectional view, similar to FIG. 3, of an alternate arrangement of the present invention.

FIG. 5 is a perspective of a single element shown in FIG. 4.

Referring now to FIG. 1, the upper half of the drawing is a plan view and the lower half is an elevation view displaced 90° from the plan view. FIG. 1 shows a dynamoelectric machine including a gas-tight casing 1 supporting a laminated stator core 2, and bearing 3 rotatably supporting a rotor 4 within casing 1. The stator core 2 is composed of laminations defining therebetween a number of radial cooling ducts or passages 5 spaced along and around the stator core. Stator windings 6, which are themselves liquid cooled, are disposed in longitudinal slots in the stator core. At each end of the rotor 4 is a fan 7 which motivates coolant gas within the stator casing. Heat exchangers 8 are included within the stator casing and they serve to cool the gas flowing therein.

Partitions, such as 9 between the stator casing and stator core, divide the casing into compartments which serve to separate gas flowing through the core radially toward the rotor from that flowing radially away from the rotor. In other words, the partitions define flow circuits from the stator outlet ducts 5b to heat exchangers 8 and fans 7 and then from fans 7 to stator inlet ducts 5a.

Rotor cooling is accomplished in a known manner by taking gas from the air gap 10 through scoop-like inlet holes or passages 11 and discharging it back to the air gap through outlet holes or passages 12. Inlet holes 11 are grouped zones at intervals along the rotor, and these inlet zones are positioned in axial registry with corresponding stator inlet ducts 5a. Similarly, outlet holes 12 are grouped in zones along the rotor and these zones are positioned in axial registry with corresponding stator outlet ducts 5b.

Within the rotor the cooling gas passes through passages within conductors arranged preferably in a diagonal geometry as described in U.S. Patent 2,986,664 and not shown here.

In the prior art, inlet holes 11 and outlet holes 12a are at the same radius and the motivation of the gas into inlet holes 11, through the conductor cooling passages and out through outlet holes 12a is derived principally from the impact pressure developed by the carefully shaped inlet passage 11 and to a lesser extent by suction or aspirator action produced by careful design of the exhaust holes 12a. The pressure difference along gap 10 between inlet zone 5a and outlet zone 5b is normally very small and contributes very little to motivating flow through the rotor.

In contrast, for the present invention, outlet holes 12 are arranged to open into the air gap at a greater diameter than do inlet holes 11. That is, the rotor surface has a larger diameter at the outlet zones than at the inlet zones. This augments the prior art self-pumping head with a centrifugal head corresponding to the difference in inlet and outlet diameters.

The raised outlet zones are shown, including non-magnetic rings 13 tightly fit over the surface of rotor 4 in the region of the discharge holes 12. Alternately, and between successive rings 13, discharge duct members 14, also non-magnetic, are inserted. Duct members 14 define outlet passages 12, and communicate with the outlet holes 12a and constitute extensions thereof.

Referring now to FIGS. 2 and 3, a detail of one form of the present invention is shown including non-magnetic supporting rings 13 and discharge extension members 14. Extension members defining outlet passages 12 are positioned on top of coil slot wedge pieces 15 so as to communicate with the outlet holes 12a therein. Individual extension members 14 are placed circumferentially around the rotor, each of the members occupying a sector of the total circumference corresponding to the pitch between adjacent rotor teeth 25. The members 14 are shaped as a T as shown in FIG. 3, so that only their outer surfaces will be continuous around the rotor circumference for low frictional drag, while minimizing the weight of the members.

Rings 13 define circumferential keyways 16 around their axial faces for the accommodation of keys 17 which protrude from members 14 for the purpose of retaining extension members 14 radially in place. Keys 17 might also be made on rings 13, with keyways 16 in members 14.

For the purpose of fixing members 14 from circumferential movement, keys 19 produre radially inwardly from members 14. Keys 19 are accommodated by keyways 20 machined from the wedge pieces 15. Alternately, it is possible to machine keyways 20 from teeth 25 or even have the entire outer surfaces of wedges 15 downset with key 19 extending from tooth to tooth.

In an alternate arrangement of the rotor outlet zones, as shown in FIGS. 4 and 5, radial extension members 18 are placed around the circumference of the rotor, each member extending arcuately from the center line of one wedge pieces 15 to the center line of the next wedge piece 15. Members 18 have arcuate axially extending keys 17 protruding therefrom for the purpose of restraining the members 18 from radial movement relative to supporting rings 13, which in this alternate arrangement are similar to rings 13 in the previously described arrangement. For the purpose of fixing members 18 against circumferential movement, axial keys 19 protrude radially inwardly from members 18. Keys 19 are accommodated by keyways 20 machined from the wedge pieces 15 or alternately as previously described. The weight of extension members 18 is minimized by removing material therefrom, as exemplified by the single large holes 21 in FIG. 4, or the plural smaller holes 22 of FIG. 5, or the arch 23 shown in phantom in FIG. 4. Radial extensions 24 of passages 12a are defined by the joining of adjacent extension members 18, at their faces 26. As shown in FIG. 5, each member 18 has machined therefrom a portion of a radial passage 24. It is also possible to have one adjoining surface 26 flat, with the entire passage 24 machined from the other adjoining surface 26.

In operation, when rotor 4 is spinning, coolant gas is motivated into inlet holes 11, through the conductor cooling passages, and out through outlet holes 24 by the impact pressure developed by scooping the gas into inlet holes 11. Further coolant motivation is derived from the centrifugal pumping action resulting from the outlet holes 24 being at a greater diameter than inlet holes 11.

The entire centrifugal load on the members 14 in FIGS. 2 and 3, or alternately on members 18 in FIGS. 4 and 5, is carried by the interspersed rings 13, which themselves are otherwise unloaded except for their own weight. The employment of circumferential keyways 16 in the rings prevents local stress concentrations. Thus the centrifugal load on teeth 25 of the rotor proper (which are carrying the centrifugal load on the generator windings through wedges 15 in the usual manner) is in no way increased by the radial extension of the usual discharge ducts 12a in the wedges.

In a typical 2-pole, 3600 r.p.m. turbine-generator, the above described structure would increase a 39" diameter rotor to about 44" in its outlet zones. Such a rotor, unmodified as above, would typically produce a pumping head of about 18" of water. Modified by the larger outlet diameter, a pumping head of 35 or 36 inches of water would be produced on the same rotor size. This would effect an increase of coolant flow by a factor of approximately 1.40 and permit an increased rotor current and hence an increase in field excitation by a factor of approximately 1.18. The foregoing figures are supplied for the purpose of illustration and not by way of limitation, since they can be varied by changes in diameters, etc., which changes are within the scope of the present invention.

It will be appreciated that a generator has herein been described which is capable of improved gap pickup cooling effectiveness.

It will occur to others of ordinary skill in the art to make modifications of the present invention which will remain within the concept and scope thereof and will not constitute patentable departure therefrom. Accordingly, it is intended that the present invention be not limited by the details in which it has been described but that it encompass all within the purview of the following claims.

What is claimed is:

1. A dynamoelectric machine having a stator and a rotor separated by an air gap,
    said rotor being of the gap pickup type and having gas inlet and outlet passages through the peripheral surface thereof communicating with said air gap,
    said stator having gas inlet and outlet passages communicating with said air gap,
    said inlet and outlet passages being spaced in alternate and corresponding zones along the length of said rotor and said stator,
    the outlet zones of said rotor comprising ring members embracing said rotor, and extension members defining said outlet passages,
    said outlet passages communicating with said air gap at a larger diameter than said inlet passages,
    said extension members mounted adjacent said ring members and fixed thereto against relative radial movement.

2. A dynamoelectric machine according to claim 1 wherein:
    said rotor peripheral surface defines axially extending keyways, and each of said extension members includes an axial key mating with one of said axially extending keyways,
    said extension members being mounted on said rotor and thereby fixed against circumferential movement relative thereto.

3. A dynamoelectric machine according to claim 1 wherein:
    each of said ring members defines a circumferential keyway in an axial face thereof, and
    each of said extension members includes an arcuate key mating with one of said circumferential keyways.

4. A dynamoelectric machine according to claim 3 in which said extension members are substantially T-shaped, defining said outlet passages substantially through their centers, and occupying a sector of the circumference of said rotor corresponding to the pitch between the centers of adjacent rotor teeth.

5. A dynamoelectric machine according to claim 3 in which said extension members occupy a sector of the circumference of said rotor corresponding to the pitch between adjacent wedges, and define said outlet passages at the juncture of adjacent extension members.

References Cited

UNITED STATES PATENTS 2,724,064   11/1955   Kilner _____ 310—61

WARREN E. RAY, Primary Examiner.

R. SKUDY, Assistant Examiner.

U.S. Cl. X.R.

310—62, 64